United States Patent
Wang et al.

(10) Patent No.: US 12,252,639 B2
(45) Date of Patent: Mar. 18, 2025

(54) UV-CROSSLINKED HOT-MELT PRESSURE-SENSITIVE ADHESIVE USED FOR POLYVINYL CHLORIDE INSULATION ADHESIVE TAPE

(71) Applicant: Hebei Yongle Tape Co., Ltd., Baoding (CN)

(72) Inventors: Feng Wang, Baoding (CN); Shuqin Qi, Baoding (CN); Shuang Li, Baoding (CN)

(73) Assignee: SHANGHAI JUJIAO ENTERPRISE DEVELOPMENT CO., LTD, Shanghai (CN)

( * ) Notice: Subject to any disclaimer, the term of this patent is extended or adjusted under 35 U.S.C. 154(b) by 175 days.

(21) Appl. No.: 17/145,537

(22) Filed: Jan. 11, 2021

(65) Prior Publication Data
US 2021/0371709 A1 Dec. 2, 2021

Related U.S. Application Data

(63) Continuation of application No. 16/074,608, filed as application No. PCT/CN2016/081908 on May 12, 2016, now abandoned.

(30) Foreign Application Priority Data

Feb. 3, 2016 (CN) .......................... 201610073413.1

(51) Int. Cl.
| | |
|---|---|
| C09J 7/38 | (2018.01) |
| C08K 3/08 | (2006.01) |
| C08K 5/07 | (2006.01) |
| C08L 9/00 | (2006.01) |
| C08L 23/08 | (2006.01) |
| C08L 67/02 | (2006.01) |
| C09J 7/20 | (2018.01) |
| C09J 7/24 | (2018.01) |
| C09J 7/35 | (2018.01) |
| C09J 11/06 | (2006.01) |
| C09J 11/08 | (2006.01) |

(Continued)

(52) U.S. Cl.
CPC ................ *C09J 7/385* (2018.01); *C09J 7/20* (2018.01); *C09J 7/245* (2018.01); *C09J 7/35* (2018.01); *C09J 11/06* (2013.01); *C09J 11/08* (2013.01); *C09J 133/08* (2013.01); *H01B 3/443* (2013.01); C08K 3/08 (2013.01); C08K 2003/0893 (2013.01); C08K 5/07 (2013.01); C08L 9/00 (2013.01); C08L 23/0869 (2013.01); C08L 67/025 (2013.01); C09J 2203/326 (2013.01); C09J 2301/408 (2020.08); C09J 2301/41 (2020.08); C09J 2301/414 (2020.08); C09J 2301/416 (2020.08); *C09J 2427/006* (2013.01); *C09J 2433/00* (2013.01); *C09J 2495/00* (2013.01); Y02P 20/10 (2015.11)

(58) Field of Classification Search
CPC ..... C09J 7/385; C09J 7/20; C09J 11/08; C09J 11/06; C09J 7/245; C09J 133/08; C09J 2433/00; C09J 2205/114; C09J 2203/326; C09J 2205/31; C09J 2205/106; C09J 2205/102; C09J 2205/10; C09J 2201/61; C09J 4/06; C09J 11/00; C09J 2201/606; H01B 3/443; C08F 2/50
See application file for complete search history.

(56) References Cited

U.S. PATENT DOCUMENTS

| | | |
|---|---|---|
| 2,974,057 A | 3/1961 | Adams |
| 4,610,745 A | 9/1986 | Sallee et al. |

(Continued)

FOREIGN PATENT DOCUMENTS

| | | |
|---|---|---|
| CN | 1599780 | 3/2005 |
| CN | 1761713 | 4/2006 |

(Continued)

OTHER PUBLICATIONS

Machine English translation of JP-2010241967-A (Year: 2010).*

(Continued)

*Primary Examiner* — Jessica M Roswell
(74) *Attorney, Agent, or Firm* — Jose Cherson Weissbrot

(57) ABSTRACT

The present invention provides a UV-crosslinked hot-melt pressure-sensitive adhesive used for a polyvinyl chloride (PVC) insulation adhesive tape, made by mixing a polymer of vinyl monomers, functional monomers, special soft monomers, and photoinitiators with a tackifying resin and an antioxidant in certain proportions; the composition of the photoinitiator polymer contains a copolymer of one or more polymerizable photosensitive initiators and acrylate monomers, or a mixture of oligomers of one or more polymerizable photosensitive initiators and acrylate high polymers. The PVC adhesive tape made using such a pressure-sensitive adhesive has the advantages of excellent mechanical properties, bonding performance, and resistance to high temperatures, and is energy-saving and environmentally friendly; the present invention overcomes the defect of the prior art that a relatively long thermal oven is needed to volatilize a solvent in the glue when coating a PVC adhesive tape, which is applicable for wrapping and strapping cable bundles in different positions of the body of an automobile, can satisfy the requirement for uses on high temperature-resistant positions of an engine inside the automobile, and reaches a long-term temperature resistance level of 125° C.

3 Claims, No Drawings

(51) Int. Cl.
  *C09J 133/08* (2006.01)
  *H01B 3/44* (2006.01)
  *C08L 23/0869* (2025.01)

(56) References Cited

U.S. PATENT DOCUMENTS

| | | | |
|---|---|---|---|
| 5,194,455 | A | 3/1993 | Massow et al. |
| 5,800,919 | A | 9/1998 | Peacock et al. |
| 6,054,213 | A | 4/2000 | Peacock et al. |
| 6,506,835 | B1 | 1/2003 | Hofmann |
| 6,734,222 | B2 | 5/2004 | Fink et al. |
| 7,988,896 | B2 | 8/2011 | Zhang et al. |
| 8,911,873 | B2 | 12/2014 | Suwa et al. |
| 9,650,547 | B2 | 5/2017 | Shigetomi et al. |
| 9,828,532 | B2 | 11/2017 | Kurian et al. |
| 2002/0137846 | A1 | 9/2002 | Fink et al. |
| 2003/0077439 | A1 | 4/2003 | Neubert et al. |
| 2005/0217789 | A1 | 10/2005 | Eckstein et al. |
| 2007/0054088 | A1 | 3/2007 | Matijasic et al. |
| 2007/0218276 | A1 | 9/2007 | Hiramatsu et al. |
| 2008/0039594 | A1 | 2/2008 | Moeller et al. |
| 2009/0277561 | A1* | 11/2009 | Ellringmann ......... B32B 29/007 156/60 |
| 2010/0104791 | A1 | 4/2010 | Baudrion et al. |
| 2011/0200808 | A1 | 8/2011 | Muessig et al. |
| 2012/0315474 | A1 | 12/2012 | Licht et al. |
| 2014/0044915 | A1* | 2/2014 | Niwa ......... C09J 7/38 428/80 |
| 2016/0053139 | A1 | 2/2016 | Arantes et al. |
| 2016/0230049 | A1* | 8/2016 | Husemann ......... C08G 18/6237 |
| 2016/0237325 | A1* | 8/2016 | Ellringmann ......... C09J 133/08 |

FOREIGN PATENT DOCUMENTS

| | | |
|---|---|---|
| CN | 101787248 | 7/2010 |
| CN | 102149780 | 8/2011 |
| CN | 102791816 | 11/2012 |
| CN | 103396631 | 11/2013 |
| CN | 104130724 | 11/2014 |
| CN | 104797673 | 7/2015 |
| CN | 104927697 | 9/2015 |
| CN | 104974678 | 10/2015 |
| CN | 105209565 | 12/2015 |
| DE | 10105278 | 8/2002 |
| DE | 10151818 | 5/2003 |
| DE | 69913693 | 12/2004 |
| DE | 102005006282 | 8/2006 |
| DE | 102012218335 | 4/2013 |
| DE | 102015209753 | 12/2015 |
| JP | 8-504857 | 5/1996 |
| JP | 2002-317090 | 10/2002 |
| JP | 2003-119301 | 4/2003 |
| JP | 9-285759 | 8/2007 |
| JP | 2008-045124 | 2/2008 |
| JP | 2010241967 A * | 10/2010 ............ C09J 7/0296 |
| JP | 2014-043543 | 3/2014 |
| JP | 2015-535030 | 12/2015 |
| WO | 2008/099111 | 8/2008 |
| WO | 2010/070026 | 6/2010 |
| WO | 2014/093141 | 6/2014 |
| WO | 2015/043997 | 4/2015 |
| WO | 2015/131938 | 9/2015 |

OTHER PUBLICATIONS

"Plastic Molding Process," Zhejiang Science and Technology Press, Mar. 1983, p. 44.
Benedek, Istvan, "Pressure-Sensitive Adhesives and Applications" Boca Raton: CRC Press Taylor & Francis Group, 2004.
BASF AG, "BASF—Our Best for Adhesives 1980-2000" Ludwigshafen: BASF AG, 2000.
"Food Packaging Engineering", Li Guochen et al., p. 70, Heilongjiang Education Press, May 1989, First Edition.
"Handbook of Plastic Industry-Polyvinyl Chloride", Pan Zuren et al., p. 802, Chemical Industry Press, Aug. 1999, First Edition.
Supplementary European Search Report issued in corresponding European Application No. 16888943 dated Jan. 22, 2019.
Supplementary European Search Report issued in corresponding IA No. EP16888944 dated Mar. 7, 2019.
International Search Report issued in corresponding IA No. PCT/CN2016/081908, dated Nov. 4, 2016.
Written Opinion issued in corresponding IA No. PCT/CN2016/081908, dated Nov. 4, 2016,.
International Preliminary Report on Patentability dated Aug. 7, 2018 issued in corresponding IA No. PCT/CN2016/081908 filed Nov. 4, 2016.
International Search Report and Written Opinion dated Nov. 9, 2016 issued in corresponding IA No. PCT/CN2016/081923 filed May 12, 2016.
International Preliminary Report on Patentability dated Aug. 7, 2018 issued in corresponding IA No. PCT/CN2016/081923 filed May 12, 2016.

* cited by examiner

UV-CROSSLINKED HOT-MELT PRESSURE-SENSITIVE ADHESIVE USED FOR POLYVINYL CHLORIDE INSULATION ADHESIVE TAPE

CROSS-REFERENCE TO RELATED APPLICATIONS

The present application is a continuation of U.S. patent application Ser. No. 16/074,608 filed Aug. 1, 2018, which is a 371 of International Application No. PCT/CN2016/081908 filed May 12, 2016, and claims the benefit of CN Patent Application No. 201610073413.1 filed Feb. 3, 2016, all of which are incorporated herein by reference in their entireties.

FIELD OF THE INVENTION

The present invention relates to the field of chemical and chemical engineering technologies, specifically to a UV-crosslinked hot-melt pressure-sensitive adhesive used for a polyvinyl chloride (PVC) insulation adhesive tape, and more specifically to a novel UV-crosslinked hot-melt pressure-sensitive adhesive used for soft PVC insulation adhesive tapes (including regular electric insulation adhesive tapes for civil use and automobile cable bundling insulation adhesive tapes).

DESCRIPTION OF THE RELATED ART

In the field of regular soft PVC electric insulation adhesive tapes for civil use and soft PVC adhesive tapes specifically for automobile cable bundling, an existing popular manner of production is to use a natural rubber-type adhesive that contains an organic solvent, which would cause pollution to various degrees during the production process. Since a large quantity of the solvent in the adhesive needs to be volatized at high temperature in a process of coating the adhesive to make an adhesive tape, a large quantity of heat source energy needs to be consumed. Moreover, the organic solvent will be further volatized into the environment, leading to a pollution; in the field of automobile cable wrapping and bundling, it has been specified, due to the implementation of environmental protection laws and regulations and strengthened environmental protection and health awareness of the public, that products used for automobile cables must satisfy the requirements by national environmental protection laws and regulations and the requirements for environmental protection in the automobile industry. The European Commission has also promulgated the requirements in the Directive on the Restriction of the Use of Certain Hazardous Substances in Electrical and Electronic Equipment (the ROHS Directive). Moreover, environmental protection requirements for the control of air quality inside automobiles and other civil fields are also increasingly strengthened.

Foreign companies that produce soft PVC electric insulation adhesive tapes have gradually eliminated solvent-containing rubber-type adhesives and increasingly use adhesives of water-based rubber-type systems and water-based acrylic acid systems. In the Chinese Invention Patent CN 101372607B, the applicant introduced an emulsified pressure-sensitive adhesive, which has excellent plasticizer migration resisting performance and is applicable for making soft PVC electric insulation adhesive tapes, and a manufacturing method thereof. The adhesive uses pure water as the solvent, which avoids environmental pollution and residual hazardous substances in products. However, PVC adhesive tape products coated with the adhesive do not have a high temperature resistance level, and the temperature resistance level is 80° C. The products can be used only on positions that are not the engine compartment, such as vehicle cages and the like. The adhesive set forth in the patent has excellent performance in resistance to migration of plasticizers from a soft PVC substrate to the adhesive. After a long-term storage or baking at high temperature of 60-80° C., plasticizers in the substrate diffuse and migrate to the adhesive layer, but the performance of the adhesive tape does not deteriorate significantly. The adhesive tape can still maintain excellent performance and completely meet the use requirements. Since the water-soluble adhesive does not contain a solvent, it is very environmentally friendly. However, its high temperature resistance is not very good, and the coating equipment takes up a large area and has a high energy consumption.

Recently, hot-melt pressure-sensitive adhesives, in particular UV-crosslinked hot-melt pressure-sensitive adhesives, have been extensively used in the field of automobile cable bundling tapes due to the characteristics that they are resistant to high temperature, resistant to solvents, and environmentally friendly. Moreover, the hot-melt coating equipment takes up a small area and has a low energy consumption. The UV-crosslinked hot-melt pressure-sensitive adhesives that are popular on the market (e.g. Novamelt® RC21171 and the like) are high polymers synthesized with acrylate monomers and polymerizable photosensitive initiators, but their adhesion to a soft PVC film, resistance to plasticizers, and softness still need to be improved.

SUMMARY OF THE INVENTION

To solve the above problems of the prior art, the present invention provides a UV-crosslinked hot-melt pressure-sensitive adhesive used for a PVC insulation adhesive tape, and more specifically provides a novel UV-crosslinked hot-melt pressure-sensitive adhesive used for a soft PVC insulation adhesive tape, which overcomes the drawback of high energy consumption when a solvent-type adhesive is coated and achieves significant social benefits in the aspect of production energy saving; the problem that the adhesive in CN 101372607B cannot withstand high temperature is solved. An automobile cable soft PVC adhesive tape made with the UV-crosslinked hot-melt pressure-sensitive adhesive according to the present invention (hereinafter the "adhesive according to the present invention" in short) achieves significant breakthroughs in resistance to high temperature, its long-term temperature resistance level reaches 125° C., its highest short-time temperature tolerance can reach up to 150° C., and it can be used in high temperature positions inside an automobile engine compartment.

The UV-crosslinked hot-melt pressure-sensitive adhesive used for a PVC insulation adhesive tape according to the present invention comprises the following major components: polymers containing vinyl monomers, functional monomers, soft monomers, and photoinitiators, a polymerization initiator, and an antioxidant.

Furthermore, the UV-crosslinked hot-melt pressure-sensitive adhesive used for a PVC insulation adhesive tape according to the present invention further comprises a copolymer of one or more polymerizable photosensitive initiators and acrylate monomers, or comprises a mixture of oligomers of one or more polymerizable photosensitive initiators and acrylate high polymers.

Optionally, the vinyl monomer is selected from a group consisting of one or more n-butyl acrylate, 2-ethylhexyl acrylate, n-octyl acrylate, isobornyl acrylate, n-dodecyl acrylate, methyl n-butyl acrylate, methyl 2-ethylhexyl acrylate, and methyl n-octyl acrylate, and the amount of the vinyl monomer is 40-65% of the total amount.

Preferably, the functional monomer is a nitrogen-containing functional monomer, preferably N-vinylpyrrolidone, and the amount thereof is 2-10% of the total amount.

Optionally, the soft monomer is C17 acrylate or methyl acrylate, and the amount of the vinyl monomer is 5-15% of the total amount.

Optionally, the photoinitiator is methacryloyloxy or acryloyloxy containing acetophenone or benzophenone derivatives (e.g. 2-hydroxy-4-(methacryloyloxy) benzophenone and the like), and the amount of the vinyl monomer is 2-10% of the total amount.

Furthermore, the UV-crosslinked hot-melt pressure-sensitive adhesive used for a PVC insulation adhesive tape according to the present invention further comprises a tackifying resin, the tackifying resin comprising one or more selected from the group consisting of rosin resins, terpene resins, petroleum resins, and corresponding hydrogenated or esterified modified resins. The amount of the tackifying resin is 2-20% of the total amount.

Optionally, the polymerization initiator comprises azo compounds, acyl peroxides, and alkyl peroxides, the azo compound being 2,2-azobisisobutyronitrile, and the acyl peroxides and alkyl peroxides being benzoyl peroxide, didecanoyl peroxide or isononanoyl peroxide, and benzotriazole-1-yl-oxy-tris(dimethylamino) phosphonium hexafluorophosphate. The amount of the polymerization initiator is 1-10% of the total amount.

Furthermore, the antioxidant is an aromatic antioxidant, a hindered phenol antioxidant, or a secondary antioxidant. The amount thereof is 0.5-1.5% of the total amount.

Optionally, the antioxidant is dianiline, p-dianiline, antioxidant 1010, or antioxidant 1076.

By adding the nitrogen-containing functional monomers into the adhesive according to the present invention, the adhesion of the adhesive according to the present invention to a PVC substrate is enhanced, and the difficult problem that an adhesive tends to fall apart from a PVC adhesive tape at high temperature is overcome; by adding multi-carbon special soft monomers into the adhesive according to the present invention, the flexibility of the adhesive is improved.

In addition to the above components, the composition of the UV-crosslinked hot-melt pressure-sensitive adhesive according to the present invention further comprises a copolymer of one or more polymerizable photosensitive initiators and acrylate monomers, or further comprises a mixture of oligomers of one or more polymerizable photosensitive initiators and acrylate high polymers. The oligomers that contain polymerizable photosensitive initiators can lower the viscosity of the hot-melt pressure-sensitive adhesive, then lower the coating temperature, and better protect the PVC substrate that tends to deform at high temperature. In the acrylate monomers, a special monomer, N-vinylpyrrolidone (NVP), is further used, in addition to commonly used n-butyl acrylate, isooctyl acrylate, acrylic acid, methyl acrylate, hydroxy ethyl acrylate, and hydroxy propyl acrylate, so as to improve adhesion to a PVC substrate and resistance to plasticizers. To improve the flexibility of the adhesive, C17 acrylate or methacrylate (from BASF) is added into the adhesive according to the present invention.

The UV-crosslinked hot-melt pressure-sensitive adhesive according to the present invention must further comprise one or more photosensitive initiators, and the most commonly used photosensitive initiators are derivatives of acetophenone and benzophenone. Under the UV irradiation, more specifically under the UVC radiation, a photosensitive initiator generates free radicals, such that the acrylate monomers in the adhesive according to the present invention are further polymerized and the acrylate polymers are crosslinked to be cured. Polymerizable photosensitive initiators are methacryloyloxy or acryloyloxy containing acetophenone or benzophenone derivatives, such as 2-hydroxy-4-(methacryloyloxy) benzophenone. The use of a photosensitive initiator having high molecular weight in the composition of the UV-crosslinked hot-melt pressure-sensitive adhesive can further lower the volatility of the adhesive layer and enable the adhesive according to the present invention to better satisfy environmental protection requirements.

To improve the bonding force, the tackifying resin contained in the adhesive according to the present invention comprises rosin resins, terpene resins, petroleum resins, and corresponding hydrogenated or esterified modified resins. To prevent the bonding agent from aging, a proper amount of an anti-aging agent is typically further added. The antioxidant contained in the adhesive according to the present invention is an aromatic antioxidant, a hindered phenol antioxidant, or a secondary antioxidant, for example, dianiline, p-dianiline antioxidant 1010, and antioxidant 1076. The polymerization initiator contained in the adhesive according to the present invention comprises azo compounds, ketone peroxides, and alkyl peroxides; and the solvent used in the adhesive according to the present invention is ethyl acetate, ketones (e.g., acetone, and methyl ethyl ketone), alcohols (e.g., methanol, ethanol, propanol, butanol, and isobutanol), toluene, xylene, or a mixture of the above solvents.

The UV-crosslinked hot-melt pressure-sensitive adhesive according to the present invention can achieve at least one of the following advantageous effects: 1. Environmentally friendly and excellent temperature resistance; 2. Applicable for wrapping and bundling of electric cables at different positions in an automobile body, in particular capable of satisfying the requirement for uses on high temperature-resistant positions of an engine inside the automobile, and reaching a long-term temperature resistance level of 125° C.

DETAILED DESCRIPTION OF THE INVENTION

Exemplary embodiments of the present solution will be described in detail below, and the effects of the UV-crosslinked hot-melt pressure-sensitive adhesive used for a PVC insulation adhesive tape according to the present invention will be described through the following embodiments, comparative embodiments, and performance data in Table 1. The purpose of providing these exemplary embodiments is to enable those skilled in the art to clearly understand the present invention and to implement the present invention according to the description herein. The specific embodiments are not intended to limit the present invention, and the scope of the present invention is defined by the appended claims.

Embodiment 1

Add 30% (wt) ethyl acetate into a reactor, heat to boil and maintain for 30 min, mix 53.9% (wt) n-butyl acrylate (BA), 3.5% (wt) acrylic acid (AA), 3.5% (wt) acryloyloxy acetophenone, 1.4% (wt) N-vinylpyrrolidone (NVP), 3.5% (wt) C17 acrylate (from BASF), and 3.5% (wt) benzotriazole-1-yl-oxy-tris(dimethylamino) phosphonium hexafluorophosphate (BOP) as an initiator and add dropwise the mixture into the reactor, fill the reactor with nitrogen for protection, and complete the dropwise addition within 1 h. After the titration is completed, continue to heat for 4 h; at 4 h, add 0.7% (wt) antioxidant Irganox 1010, maintain the heating state, vacuumize the reactor until the solvent (i.e., ethyl acetate) is completely separated, and remove the solvent to obtain a hot-melt pressure-sensitive adhesive with no solvent.

Preparation of a high temperature resistant PVC adhesive tape: complete the preparation with a slot die coating or a rolling or laminating coating process on a hot-melt coating machine, install a high temperature resistant PVC substrate on an unwinding shaft, and drag it to a winding shaft. Set the temperature of a melt tank at 130-140° C. and the temperature of a coating head at 135° C., and adjust the ratio of the rotational speed of an adhesive pump to the speed of a main machine according to the weight of loaded adhesive. Set the winding tension and unwinding tension, and turn on a cooling device. Adjust the speed of the main machine, slowly move the coating head to the PVC film surface, turn on the adhesive pump switch for coating, adjust the space between the coating head and the substrate, and adjust the speed of the coating machine for coating. The coating amount of the hot-melt pressure-sensitive adhesive is 18 g/m$^2$, and the adhesive layer is crosslinked and cured by UV irradiation with a group of UV lamps. The UV lamps that are used include high-pressure mercury lamps, medium to low-pressure mercury lamps, or LED lamps, and the minimum UV irradiation energy thereof needs to reach 10 mJ/cm$^2$. The crosslinked and cured adhesive tape is wound and divided to obtain the high temperature resistant PVC adhesive tape product.

Embodiment 2

Preparation of a high polymer (A): add 30% (wt) ethyl acetate into a reactor, heat to boil and maintain for 30 min, mix 63% (wt) n-butyl acrylate (BA), 3.5% (wt) acrylic acid (AA), and 3.5% (wt) benzotriazole-1-yl-oxy-tris(dimethylamino) phosphonium hexafluorophosphate (BOP) and add dropwise the mixture into the reactor, fill the reactor with nitrogen for protection, and complete the dropwise addition within 1 h. After the titration is completed, continue to heat for 4 h; at 4 h, maintain the heating state, vacuumize the reactor, and discharge the high polymer (A) for later use;

Preparation of an oligomer (B): add 50% (wt) toluene into a reactor, heat to boil and maintain for 30 min, mix 33% (wt) n-butyl acrylate (BA), 1.5% (wt) acrylic acid (AA), 5% (wt) acryloyloxy acetophenone as a photo-initiator, 2.5% (wt) benzotriazole-1-yl-oxy-tris(dimethylamino) phosphonium hexafluorophosphate (BOP), 5% (wt) C17 acrylate (from BASF), and 2% (wt) N-vinylpyrrolidone (NVP), and add dropwise the mixture into the reactor, and complete the dropwise addition within 2 h. After the dropwise addition is completed, add 1% (wt) antioxidant 1010, maintain the heating state, vacuumize the reactor, and discharge the oligomer (B) for later use; mix the high polymer A and the oligomer B (50% of A and B respectively), heat to 130° C., stir thoroughly and mix homogeneously, and then cool for later use; use the same method as the one in Embodiment 1 to obtain the high temperature resistant PVC adhesive tape.

Embodiment 3: heat 95% (wt) Embodiment 1 and 5% (wt) hydrogenated petroleum resin Regalite® 1090 (Eastman, USA) to 130° C., stir thoroughly, and mix homogeneously to prepare the product; use the same method as the one in Embodiment 1 to obtain the high temperature resistant PVC adhesive tape.

Comparative Embodiment 1

Synthesis of an acrylate copolymer emulsion:
(1) Divide an overall monomer formula [20 g isooctyl acrylate (2-EHA), 50 g butyl acrylate (BA), 60 g dibutyl maleate (DBM), 50 g methyl methacrylate (MMA), 7.5 g hydroxyethyl acrylate (HEA), 4.5 g acrylic acid (AA), and 8.0 g N-hydroxymethyl acrylamide (N-MAM)] into two components, Component A and Component B, for respective mixing and preparation of pre-emulsions, wherein Component A comprises the following ingredients: 50 g BA, 50 g MMA, 4.5 g HEA, 2.8 g AA, and 8.0 g N-MAM; and Component B comprises the following ingredients: 20 g 2-HEA, 60 g DBM, 3.0 g HEA, and 1.7 g AA;
(2) Add 160 g deionized water, 2.6 g sodium bicarbonate as a buffer, and 0.78 g emulsifier Co-436 (a product from Rhodia Inc.) into a 1000 ml three-neck round bottom flask, mix homogeneously, heat to raise the temperature to 78° C., add an aqueous solution of 0.40 g ammonium persulfate as an initiator, and maintain the temperature at 82-84° C. while adding the pre-emulsion of monomers in Component A at an even rate for a first phase of copolymerization of the emulsion. Complete the addition within 1.5 h, and after the addition is completed, maintain the temperature in the temperature range while adding the pre-emulsion of monomers in Component B at an even rate for a second phase of copolymerization of the emulsion. Complete the addition within 2.5 h;
(3) Maintain the temperature at 83-85° C., continue stirring to react for 1 h, then cool and filter to discharge the material, and obtain an acrylate copolymer emulsion that can be used to further prepare an emulsion pressure-sensitive adhesive;
(4) Preparation of a pressure-sensitive adhesive: add 45 g of a commercially available polyvinyl acetate emulsion into 300 g of the acrylate copolymer emulsion synthesized above, mix homogeneously, and then use ammonia to adjust the pH to 7-8 to obtain a desired emulsion pressure-sensitive adhesive, which has a solid content of 53%;
(5) Performance testing: coat the obtained emulsion pressure-sensitive adhesive on a 0.15 mm-thick soft PVC (SPVC) film substrate to prepare small rolls of an electric pressure-sensitive adhesive tape with a dry adhesive layer thickness of 20 μm; cure for 8 h in a 70° C. environment, then test various properties of the adhesive tape, and test the adhesive tape's 180° peel strength according to the Chinese national standard GB/T2792-1998.

Comparative Embodiment 2

Add 30% (wt) ethyl acetate into a reactor, heat to boil and maintain for 30 min, mix 58.9% (wt) n-butyl acrylate (BA), 3.5% (wt) acrylic acid (AA), 3.5% (wt) acryloyloxy acetophenone, and 3.5% (wt) benzotriazole-1-yl-oxy-tris(dimethylamino) phosphonium hexafluorophosphate (BOP) as an initiator and add dropwise the mixture into the reactor, fill the reactor with nitrogen for protection, and complete the dropwise addition within 1 h. After the titration is completed, continue to heat for 4 h; at 4 h, add 0.7% (wt) antioxidant Irganox 1010, maintain the heating state, and vacuumize the reactor until the solvent is completely separated.

The tack, 180° peel strength, and low-speed unwinding strength of the pressure-sensitive adhesive tapes in Table 1 are determined using methods according to Chinese national standards GB/T 4852-1984, GB/T 8451-1998, GB/T2792-1998, and GB/T4850-1984, respectively; the method for determining temperature stability is as follows: use a pressure-sensitive adhesive tape to wind around cables, age for 24 h at 150° C., observe whether the aged cables have curled tapes at the edge or have loose tapes, or whether there is overflown adhesive liquid, and determine that the pressure-sensitive adhesive tape is qualified when the tape is not curled, the tape does not become loose, or there is no overflown adhesive liquid; the method for determining flexibility is: treat an adhesive tape (having a width of 19-25 mm) with a length of at least 10 m wound around a paper core (having an outer diameter of 36 mm and a paper core wall thickness of 3-4 mm) at 20±1° C. and a relative humidity of 50±5% for 24 h, unwind the adhesive tape at a speed of 15-20 cm/s to evenly open up the adhesive tape, and determine that the flexibility is good if there is no noise and no sticky-sliding/skidding phenomenon; if the unwinding is skidding or has noise, determine that the flexibility is poor.

and resistance to plasticizers. The addition and use of the special soft monomers improves the flexibility of the PVC adhesive tapes.

What is claimed is:

1. A composition for a UV-crosslinked hot-melt pressure-sensitive adhesive used for a PVC insulation adhesive tape, comprising the following major components: polymers containing vinyl monomers, functional monomers, soft monomers, and polymerizable photosensitive initiators, a polymerization initiator, and an antioxidant;
    wherein the vinyl monomer is selected from a group consisting of one or more n-butyl acrylate, 2-ethylhexyl acrylate, n-octyl acrylate, isobornyl acrylate, n-dodecyl acrylate, methyl n-butyl acrylate, methyl 2-ethylhexyl acrylate, and methyl n-octyl acrylate, and the amount of the vinyl monomer is 40-65% of the total amount;
    wherein the functional monomer is N-vinylpyrrolidone, and the amount thereof is 2-10% of the total amount;
    wherein the soft monomer is C17 acrylate or C17 methacrylate, and the amount thereof is 5-15% of the total amount;
    wherein the polymerizable photosensitive initiator is methacryloyloxy or acryloyloxy containing acetophenone or benzophenone derivative, and the amount thereof is 2-10% of the total amount; and
    wherein the polymerization initiator comprises azo compounds, acyl peroxides, and alkyl peroxides, the azo compound being 2,2-azobisisobutyronitrile, and the acyl peroxides being benzoyl peroxide, didecanoyl peroxide or isononanoyl peroxide, or the polymerization initiator is benzotriazole-1-yl-oxy-tris (dimethyl-

TABLE 1

Performance testing results for soft PVC adhesive tapes

| | Tack (number of balls) | 180° peel strength (N/cm) | Low-speed unwinding strength (N/cm) | Flexibility and adhesion tests | Temperature stability |
|---|---|---|---|---|---|
| Embodiment 1 | 17 | 1.5 | 2.4 | Good flexibility, no noise during rapid unwinding, and no adhesive falling off during rapid unwinding | No edge curling, no loose adhesive, and no overflown adhesive |
| Embodiment 2 | 18 | 1.4 | 2.2 | Good flexibility, no noise during rapid unwinding, and no adhesive falling off during rapid unwinding | No edge curling, no loose adhesive, and no overflown adhesive |
| Embodiment 3 | 16 | 1.7 | 3.0 | Good flexibility, no noise during rapid unwinding, and no adhesive falling off during rapid unwinding | No edge curling, no loose adhesive, and no overflown adhesive |
| Comparative Embodiment 1 | 8 | 1.1 | 2.1 | Slightly poorer flexibility, and noise during rapid unwinding | Loose adhesive tape, and overflown adhesive liquid |
| Comparative Embodiment 2 | 16 | 1.4 | 2.4 | Slightly poorer flexibility, and noise during rapid unwinding | Loose adhesive tape, and overflown adhesive liquid |

It can be seen by comparing Embodiments 1-3 and Comparative Embodiments 1-2 that the soft PVC adhesive tapes made with the UV-crosslinked hot-melt pressure-sensitive adhesive used for soft PVC insulation adhesive tapes have significantly higher temperature resistance than that of the adhesive tapes made with the emulsion-type pressure-sensitive adhesive. The use of the functional monomers improves the adhesive's adhesion to the PVC substrate amino) phosphonium hexafluorophosphate, and the amount of the polymerization initiator is 1-10% of the total amount;
    wherein the UV-crosslinked hot-melt pressure-sensitive adhesive optionally further comprise a tackifying resin,
    wherein the tackifying resin is selected from the group consisting of rosin resins, terpene resins, petroleum resins, corresponding hydrogenated resins, corresponding esterified modified resins, and combination thereof, and wherein the amount of the tackifying resin being 0-5% of the total amount, and wherein the UV-crosslinked hot-melt pressure-sensitive adhesive further comprise a copolymer of one or more polymerizable photosensitive initiators and acrylate monomers, or comprising a mixture of oligomers of one or more polymerizable photosensitive initiators and acrylate high polymers.

2. The composition for a UV-crosslinked hot-melt pressure-sensitive adhesive used for a PVC insulation adhesive tape according to claim 1, wherein the antioxidant is an aromatic antioxidant, a hindered phenol antioxidant, or a secondary antioxidant, and the amount thereof is 0.5-1.5% of the total amount.

3. The composition for a UV-crosslinked hot-melt pressure-sensitive adhesive used for a PVC insulation adhesive tape according to claim 2, wherein the antioxidant is dianiline, p-dianiline, or pentaerythritol tetrakis (3-(3,5-di-tert-butyl-4-hydroxyphenyl) propionate).

* * * * *